(12) United States Patent
Hiraki

(10) Patent No.: US 6,504,539 B1
(45) Date of Patent: Jan. 7, 2003

(54) METHOD FOR DISPLAYING AN OBJECT IN THREE-DIMENSIONAL GAME

(75) Inventor: Yoshikazu Hiraki, Osaka (JP)

(73) Assignee: Sony Computer Entertainment Inc., Tokyo (JP)

( * ) Notice: Subject to any disclaimer, the term of this patent is extended or adjusted under 35 U.S.C. 154(b) by 222 days.

(21) Appl. No.: 09/663,065

(22) Filed: Sep. 15, 2000

(30) Foreign Application Priority Data

Sep. 16, 1999 (JP) .......................................... 11-262732
Aug. 17, 2000 (JP) ...................................... 2000-247771

(51) Int. Cl.⁷ ............................................. G06T 15/00
(52) U.S. Cl. ...................................................... 345/427
(58) Field of Search ............................... 345/419, 426, 345/427, 428, 629, 630, 634

(56) References Cited

U.S. PATENT DOCUMENTS

| 6,165,073 A | 12/2000 | Miyamoto et al. |
| 6,275,236 B1 * | 8/2001 | Delahunty ................. 345/435 |
| 6,304,267 B1 | 10/2001 | Sata |

FOREIGN PATENT DOCUMENTS

| JP | 07-075689 | 3/1995 |
| JP | 07-244747 | 9/1995 |
| JP | 10-263204 | 10/1998 |
| JP | 11-004963 | 1/1999 |
| JP | 11-007543 | 1/1999 |
| JP | 11-128533 | 5/1999 |
| JP | 11-235466 | 8/1999 |

* cited by examiner

Primary Examiner—Phu K. Nguyen
(74) Attorney, Agent, or Firm—Fitch, Even, Tabin & Flannery

(57) ABSTRACT

This invention allows a player to perform and enjoy shooting operations without any deterioration of three-dimensional display by displaying an enemy object in the field of view of the player when the player object and the enemy object are within a predetermined distance from each other. A game calculating means 200 performs a calculation to determine the position of the player object based on operation information from an operating means 100. When the enemy object is present within the predetermined distance from the position of the player object, a virtual camera control means 400 sets a virtual camera such that it pursues the enemy object and such that the player object is present in the field of view to generate a field image as viewed from the virtual camera.

19 Claims, 15 Drawing Sheets

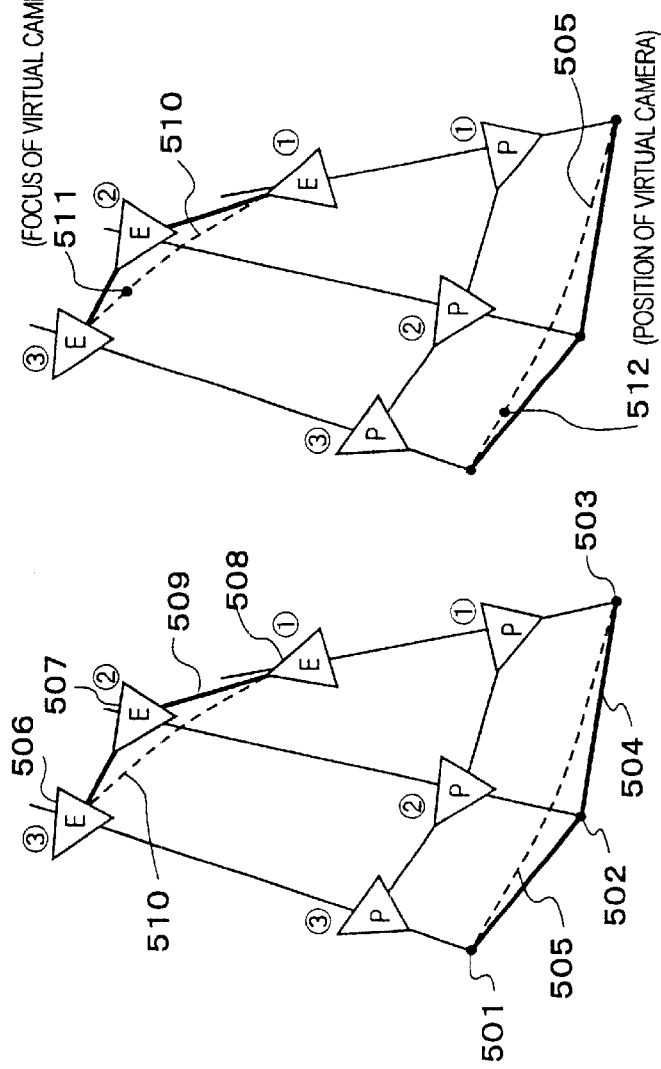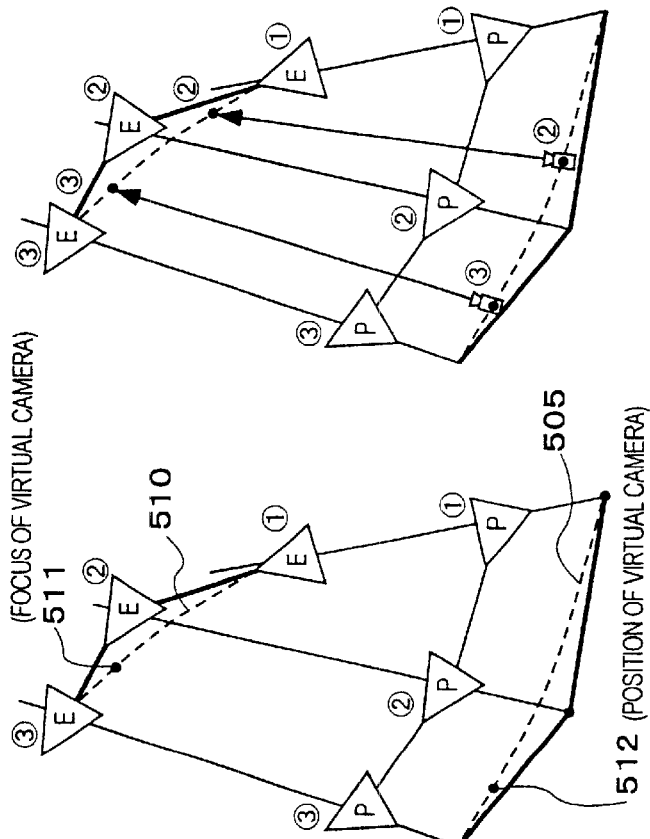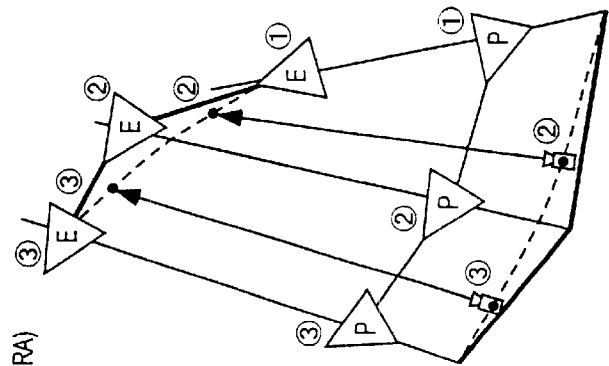

METHOD FOR DISPLAYING AN OBJECT IN THREE-DIMENSIONAL GAME

This application claims a priority based on Japanese Patent Applications 11-262732 filed on Sep. 16, 1999, and 2000-247771 filed on Aug. 17, 2000, the entire contents of which are incorporated herein by reference for all purposes.

BACKGROUND OF THE INVENTION

The present invention relates to a technique for displaying an object in a video game.

Shooting games are known in which a player operates a player object displayed on a screen to beat an enemy object one after another.

In the case of a shooting game, images for generating each of an enemy object, a background, etc. are prepared in advance to allow continuous display of the same. A player object, an enemy object, a background, etc. are displayed with the position and direction of the player object serving as a reference.

In present video games, a player object, an enemy object and a background are generally displayed on a three-dimensional basis. As a result, a player can enjoy a game by operating the player object as if it were present in a three-dimensional space even though it is on a two-dimensional screen.

SUMMARY OF THE INVENTION

In a shooting game, since display (especially three-dimensional display) is performed with reference to the position and direction of the player object, an enemy object may not be displayed on the screen when the direction of the player object moves out of the direction of the enemy object as a result of an operation of the player. In such a case, the player may miss the position of the enemy object.

When the player object and enemy object pass each other, the player may also miss the position of enemy object.

Since this makes it difficult for the player to operate, the game slows down and becomes less interesting.

It is an object of the invention to display an enemy object in the field of view of a player when the player object and the enemy object are located within a predetermined distance from each other, which makes it possible for the player to perform shooting operations with fun without reducing the effect of three-dimensional display.

In order to achieve the above-described object, the present invention provides a method for displaying objects in an entertainment apparatus to which an operating device can be connected, having the steps of moving a player object generated in a virtual world in accordance with the contents of an operation of a player accepted through the operating device, moving a game object generated in the virtual world based on data for a game, setting a virtual camera in a direction to pursue the game object and in a position where the player object is kept in the field of view when the game object is present within a range at a predetermined distance N1 from the position of the player object, and generating a field image as viewed from the virtual camera.

BRIEF DESCRIPTION OF THE DRAWINGS

FIGS. 5A, 5B and 5C are illustrations of a method for setting a virtual camera according to the embodiment of the invention.

DETAILED DESCRIPTION OF THE PREFERRED EMBODIMENT

Embodiments of the present invention will now be described with reference to the drawings.

The following description will refer to an example of the application of the invention to a three-dimensional shooting game in which a moving object (player object) to be operated by a player beats a moving object (enemy object) to be beaten by the player (enemy object) one after another. However, the application of the invention is not limited to such a game.

A description will now be made with reference to FIGS. 10 and 11 on an example of an overview of an entertainment apparatus in which the present embodiment can be implemented and on an example of a schematic hardware configuration therefor.

Figure 10:
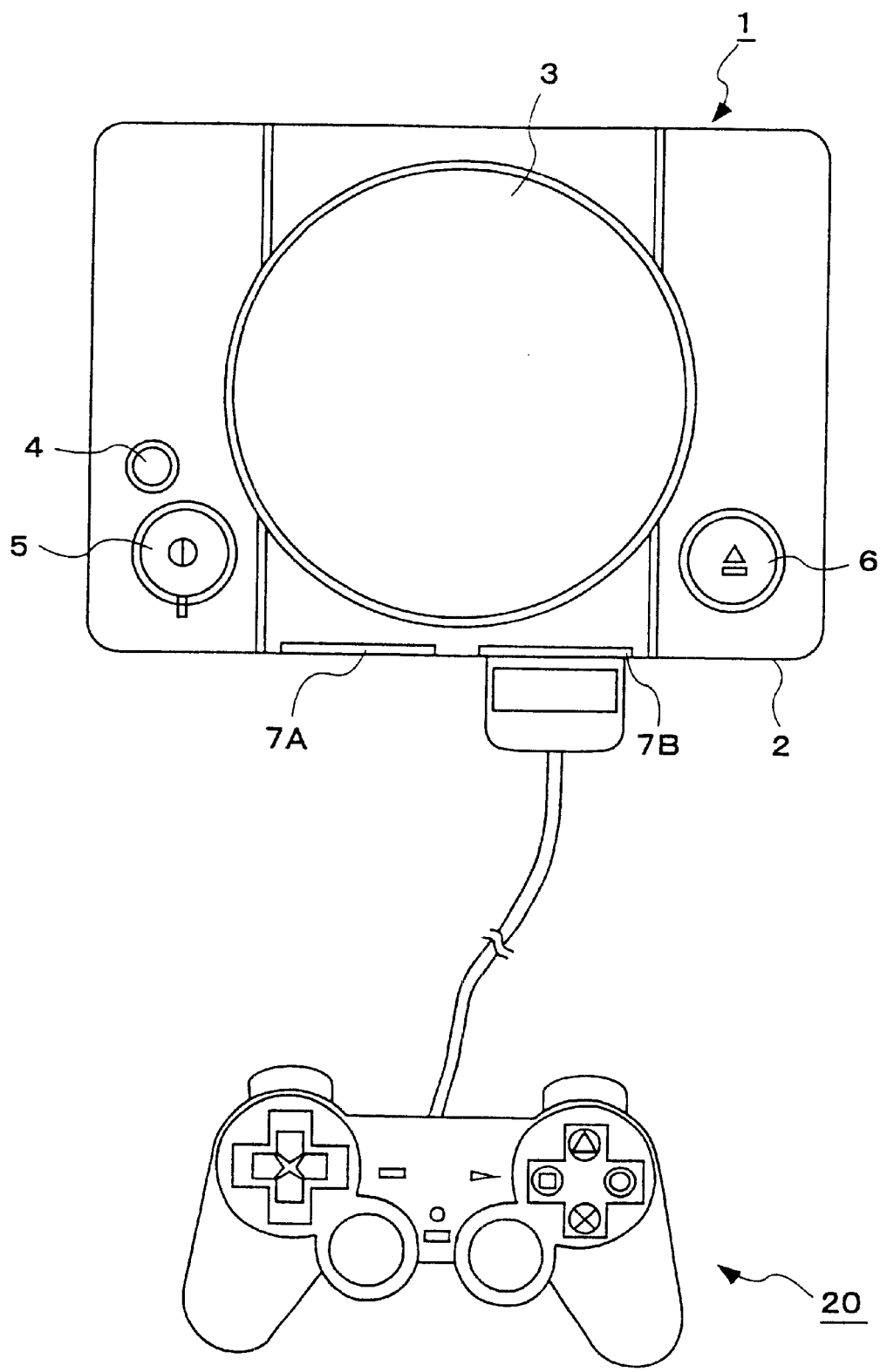
FIG. 10 is an illustration of an example of an overview of an entertainment apparatus in which the embodiment of the invention can be implemented.

For example, an overview of the present entertainment apparatus is as shown in FIG. 10. The entertainment apparatus 1 reads a game program recorded in an optical disk such as a CD-ROM and executes the same in accordance with operations of a player.

A main body 2 of the entertainment apparatus 1 has a configuration including a disk loading portion 3 for loading an optical disk which is a recording medium with a game program recorded thereon, a reset switch 4 for resetting the game arbitrarily, a power supply switch 5, a disk operating switch 6 for operating the loading of the optical disk and slot portions 7A and 7B (two of such portions are provided in the present embodiment).

An operating device (controller) 20 can be connected to the slot portions 7A and 7B, and a memory card in and from which game data can be recorded and read can be also loaded in the slot portions.

Figure 11:
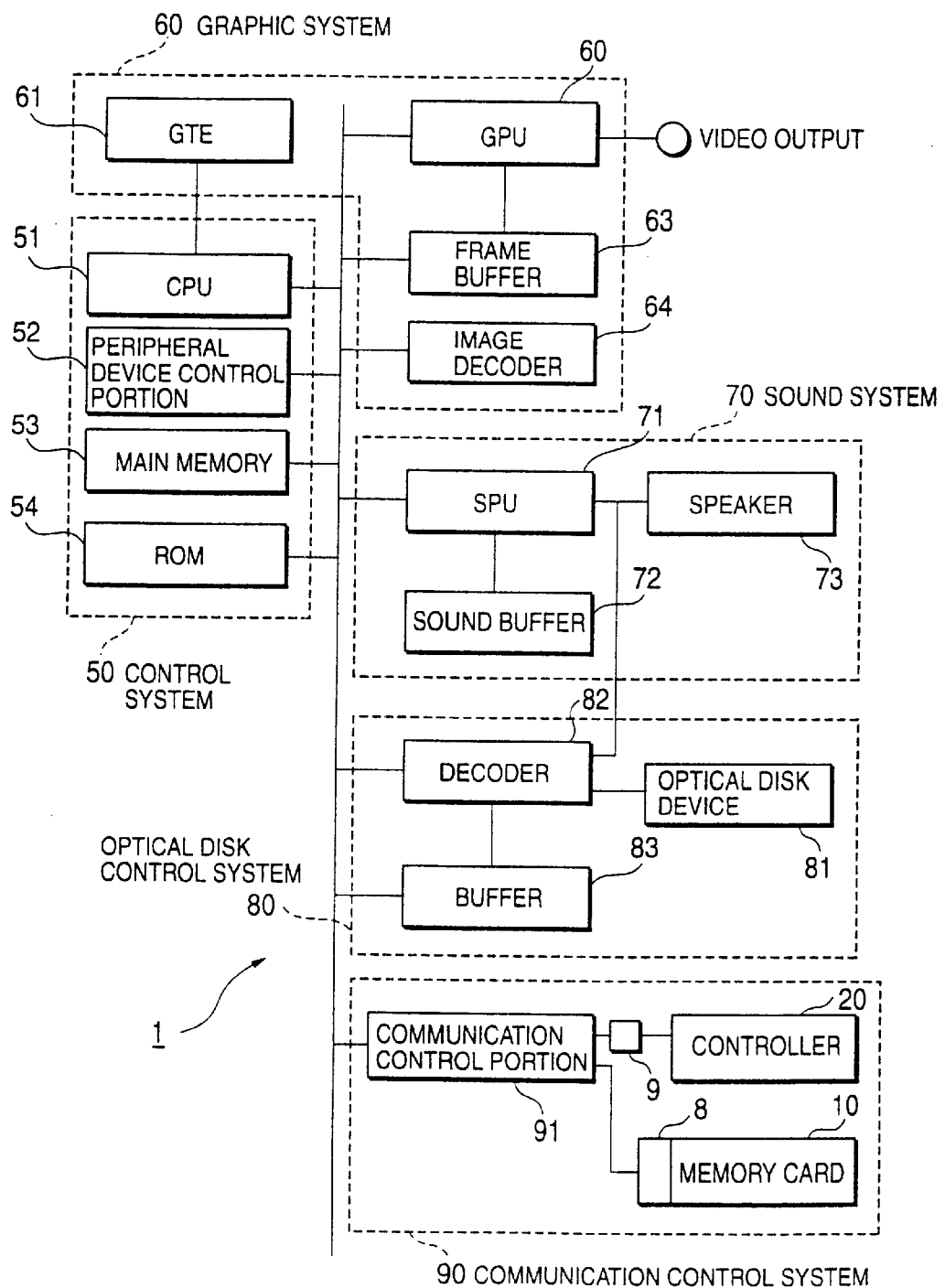
FIG. 11 is an illustration of an example of a schematic hardware configuration of a entertainment apparatus in which the embodiment of the invention can be implemented.

For example, the entertainment apparatus 1 has a schematic hardware configuration as shown in FIG. 11. The entertainment apparatus 1 has a control system 50 constituted by a CPU 51, peripheral devices therefor, etc., a graphic system 60 constituted by a GPU 62 or the like for drawing images in a frame buffer 63, a sound system 70 constituted by an SPU (sound processing unit) or the like for generating sounds of music, sound effects and the like, an optical disk control system 80 for controlling an optical disk on which a game program is recorded, and a communication control system 90 for controlling input and output of signals from the controller 20 to which instructions from a player are input and data from a memory card 10 for storing a setting for a game and the like.

Referring to FIG. 11, the control system 50 has a configuration including the CPU 51, a peripheral device control portion 52 for controlling operations such as interrupts and direct memory access (DMA) transfers, a main memory 53 constituted by a RAM (random access memory) and a ROM (read only memory) 54 in which an operating system (OS) for managing the main memory 53, graphic system 60, sound system 70, etc. is stored.

When powered on, the CPU 51 executes the OS stored in the ROM 54 to control the entertainment apparatus 1 as a whole including the graphic system 60 and sound system 70.

When the OS is executed, the CPU 51 performs initialization including operation check and thereafter controls the optical disk control system 80 to execute the game program recorded on the optical disk. When the game program is executed, the CPU 51 controls the graphic system 60, sound system 70, etc. to control display of images and generation of sounds of music and sound effects and the like in accordance with instructions from the player.

Referring again to FIG. 11, the graphic system 60 has a configuration including a GTE (geometry transfer engine) 61 for performing processes such as coordinate transformation, the GPU 62 for performing a drawing process according to drawing instructions from the CPU 51, the frame buffer 63 for storing images drawn by the GPU 62, and an image decoder 64 for decoding compressed and encoded image data.

For example, the GTE 61 has a parallel calculation function for performing a plurality of calculations in parallel to be able to perform calculations such as coordinate transformation, perspective transformation and light source calculations at a high speed in accordance with requests for calculations from the CPU 51. The GPU 62 draws polygons and etc. in the frame buffer 63 in accordance with drawing instructions from the CPU 51.

The frame buffer 63 is constituted by a dual port RAM to allow drawing by the GPU 62, transfers from the main memory 53 and readouts for display to be performed simultaneously. The frame buffer 63 is provided with a display area which is output as a video output and, in addition, a CLUT area for storing a color look-up table (CLUT) which is referred to when the GPU 62 draws polygons etc. and a texture area for storing features (textures) inserted in polygons etc. which are subjected to coordinate transformation and drawn by the GPU 62 during drawing.

The image decoder 64 decodes image data of still images and dynamic images stored in the main memory 53 under control of the CPU 51 and stores it in the main memory 53 again. The decoded image data can be stored in the frame buffer 63 by the GPU 62 to be used as background images.

Referring again to FIG. 11, the sound system 70 has a configuration including an SPU 71 for generating sounds of music, sound effects etc. in accordance with instructions from the CPU 51, a sound buffer 72 in which waveform data and etc. are stored by the SPU 71, and a speaker 73 for outputting the sounds of music, sound effects, etc. generated by the SPU 71. The SPU 71 has a function of decoding audio data and a function of reproducing the waveform data stored in the sound buffer 72 as it is or after modulating it.

Referring again to FIG. 11, the optical disk control system 80 has an optical disk device 81 for reading a game program, data or the like recorded on an optical disk, a decoder 82 for decoding the game program, data or the like, and a buffer 83 for temporarily storing the data read by the optical disk device 81 to increase the speed of reading from the optical disk.

Referring again to FIG. 11, the communication control system 90 has a configuration including a communication control portion 91 for controlling communication with the CPU 51 through a bus, and a controller connecting portion 9 to which the controller 20 for inputting instructions from a player is connected and a memory card inserting portion 8 to which the memory card 10 for storing setting data of a game is connected are provided at the communication control portion 91.

The controller 20 connected to the controller connecting portion 9 has a plurality of instruction keys for inputting instructions from a player and transmits states of the instruction keys in accordance with instructions from the communication control portion 91. The communication control portion 91 transmits the states of the instruction keys of the controller 20 to the CPU 51. Thus, instructions from the player are input to the CPU 51, and the CPU 51 performs processes in accordance with the instructions from the player based on the game program which is being executed.

Further, when the setting data of a game being played must be stored, the CPU 51 transmits the data to be stored to the communication control portion 91, and the communication control portion 91 writes the data from the CPU 51 in the memory card 10 inserted in a slot of the memory card inserting portion 8.

A description has been made on an example of an overview of a entertainment apparatus in which the present embodiment can be implemented and an example of a schematic hardware configuration therefor. Obviously, the present example sets any limitation on entertainment apparatuses in which the present embodiment can be implemented.

Figure 1:
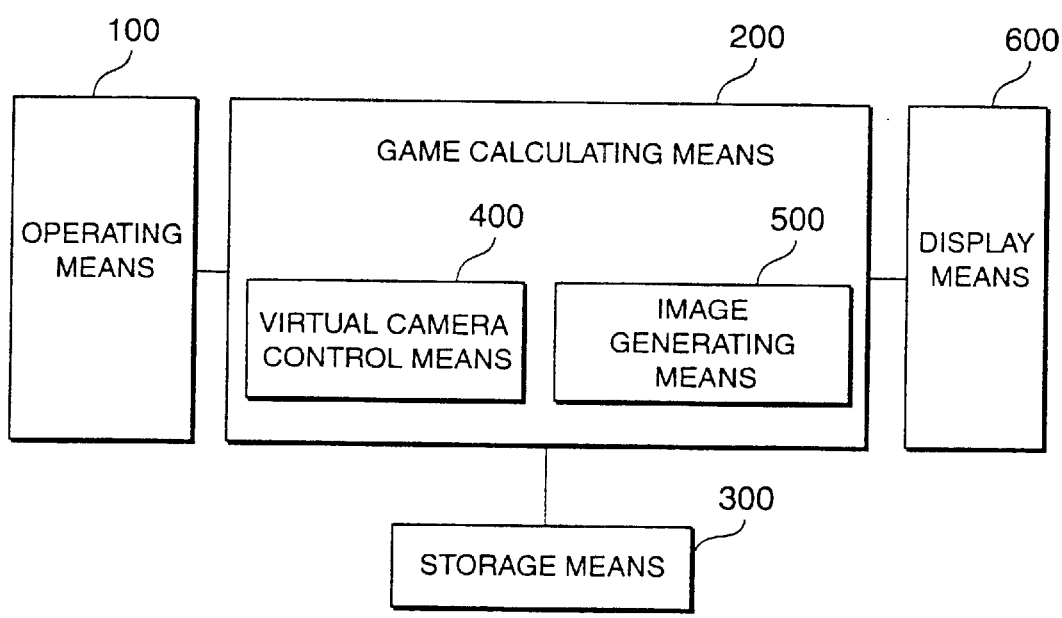
FIG. 1 is a functional block diagram of major parts of a entertainment apparatus according to an embodiment of the invention.

FIG. 1 is a functional block diagram of major parts of a entertainment apparatus according to the present embodiment.

In FIG. 1, an operating means 100 allows a player to input operation data. Operation data input with the operating means 100 are sent to game calculating means 200.

The game calculating means 200 includes a virtual camera control means 400 and an image generation means 500. It performs processes including a process of running a game, a process of determining the position and direction of a player object and a process of determining the positions and directions of displayed matters (including an enemy object) in a three-dimensional game space based on the operation data received from the operating means 100 and a game program, game data, etc. stored in a storage means 300. Especially, it performs a process of determining the position and direction of a virtual camera to set the virtual camera with the virtual camera control means 400, and it performs a process of generating a field image which is the three-dimensional game space as viewed by the virtual camera and displaying it on a display means 600 with the image generation means 500.

The game calculating means 200 may be achieved by hardware such as a CPU 51 or a GPU 62. The storage means 300 may be constituted by hardware such as a CD-ROM (compact disk-read only memory), a main memory 53 or a hard disk.

The display means 600 may be constituted by a monitor device, television or the like utilizing a CRT (cathode ray tube). The display means 600 may be integrated with the entertainment apparatus main body or alternatively be separated from the main body depending on the mode in which the entertainment apparatus is used, i.e., whether it is intended for home use or business use.

Figure 2A:
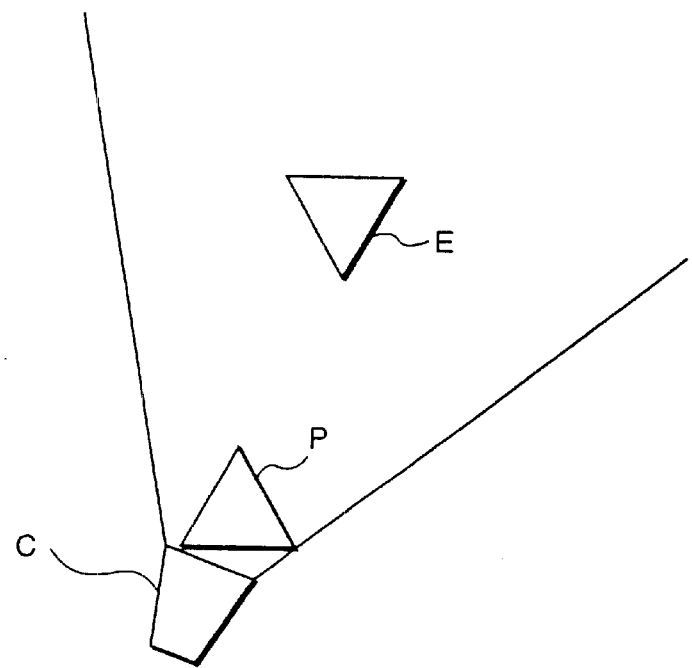
FIGS. 2A and 2B are illustrations of an example of display of objects according to the embodiment of the invention.

FIG. 2A shows an example of display of objects in the present embodiment.

The game calculating means 200 performs calculations for moving a player object, an enemy object, a background, etc. in the three-dimensional space based on operation data received from the operating means 100 and a game program, game data and the like stored in the storage means 300. At this time, the game calculating means 200 also performs calculations to determine the position and direction of the virtual camera based on the positions and directions of the enemy object and player object. Specifically, the game calculating means 200 sets the virtual camera with the virtual camera control means 400 in order to track the enemy object and allow the player object to be present in the field of view.

The game calculating means 200 generates a field image of the three-dimensional game space as viewed from the virtual camera with the image generating means 500, and the generated image is displayed on the display means 600. The field image is generated using game data (data of the player object, data of the enemy object, data of display objects that serve as the background, and the like) prepared in the storage means 300 in advance.

In the present embodiment, the virtual camera is set in a manner different from a conventional one to provide a field image (a state of display of objects) which is different from that in the related art.

A difference between a field image according to the present embodiment and that in the related art will now be described.

Figure 3A:
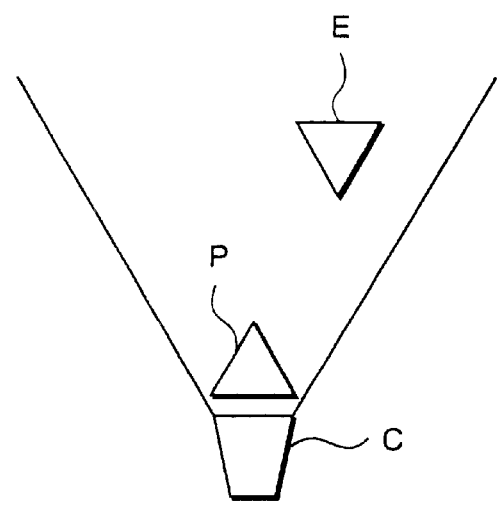
FIGS. 3A, 3B and 3C are illustrations of an example of display of objects according to the related art.

According to the related art, a calculation for moving a player object is performed based on an instruction (operation data) from a player; a virtual camera is set in order to pursue the player object; and a field image as viewed from the virtual camera is generated. That is, the position and direction of the conventional virtual camera is as shown in FIG. 3A.

Figure 3B:
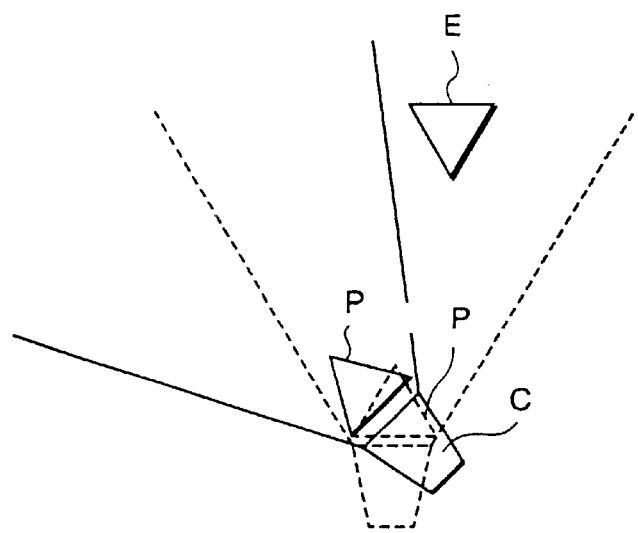
Figure 3C:
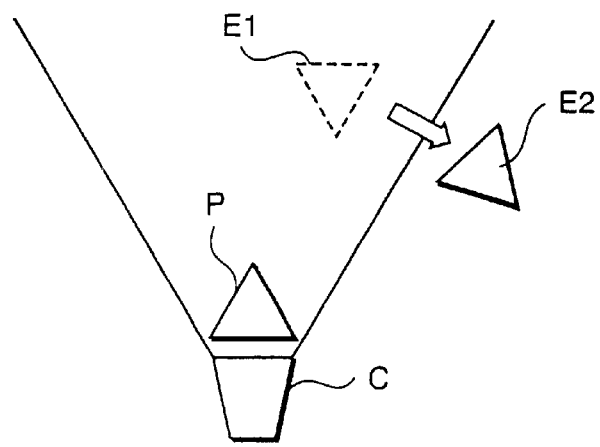

For example, when the direction of the player object P is changed as shown in FIG. 3B, since the virtual camera C pursues the player object P, the direction of the view point of the virtual camera C also changes and, as a result, the enemy object E can get out of the field of view. For example, when the enemy object moves from E1 to E2 as shown in FIG. 3C, since the direction of the view point of the virtual camera does not change unless the direction of the player object is changed, the enemy object E2 can get out of the field of view.

On the contrary, a field of view according to the present embodiment is as shown in FIG. 2A. Specifically, in the present embodiment, when an enemy object E is present within a predetermined distance from the position of a player object P, a virtual camera C is set such that the enemy object E is pursued and the player object P is present in the field of view to always keep the enemy object in the field of view.

Figure 2B:
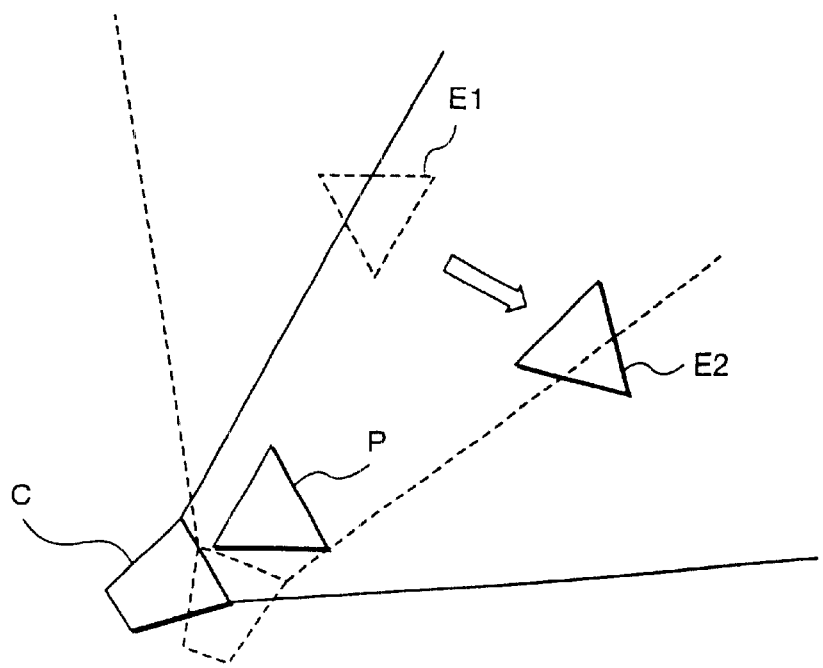

For example, if the enemy object E moves while the virtual camera C has a field of view as shown in FIG. 2A, the direction of the virtual camera is changed to catch the enemy object E2 in the field of view as shown in FIG. 2B.

A description will now be made with reference to FIGS. 4 and 5 on a method for setting a virtual camera C according to the present embodiment.

Figure 4:
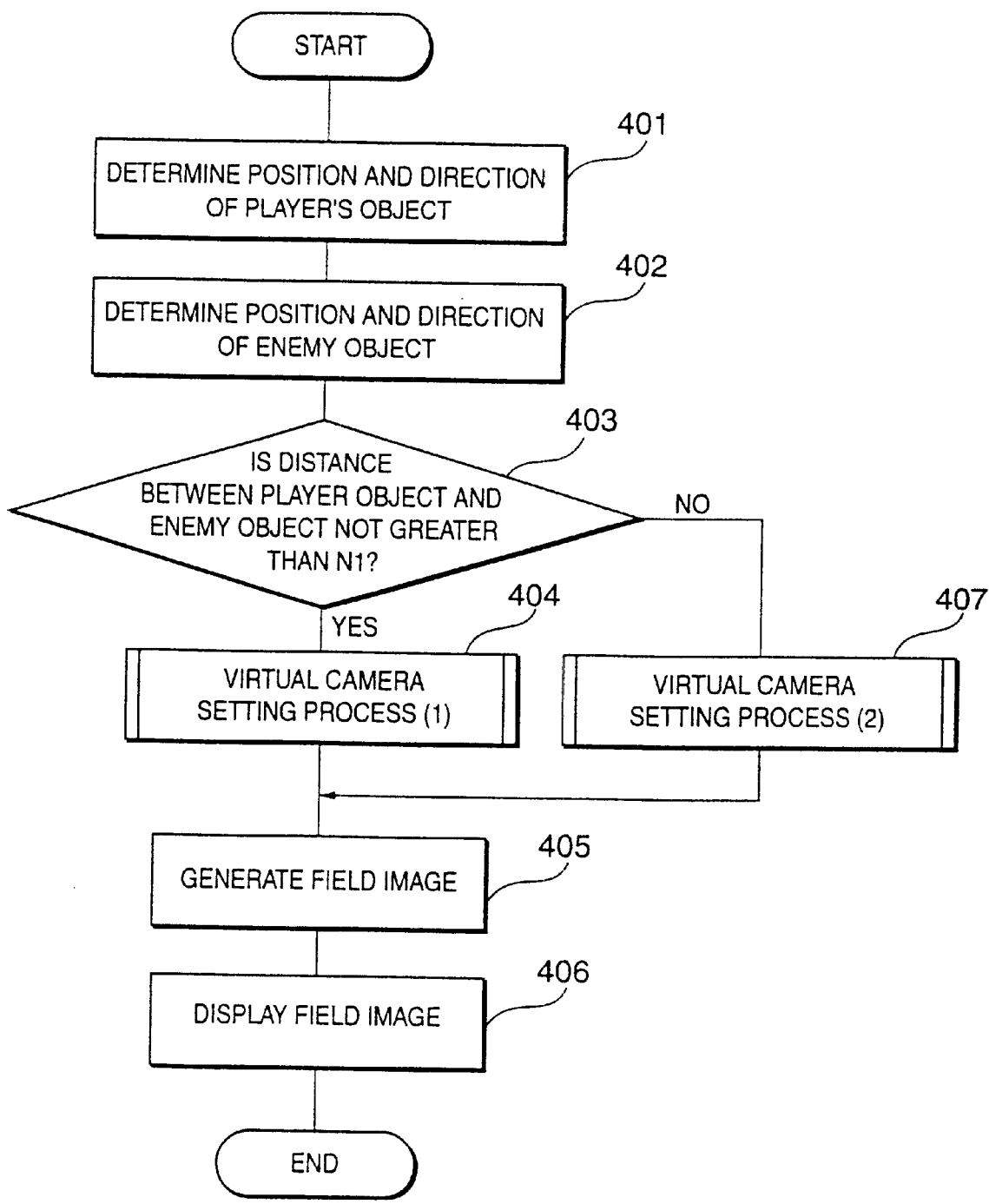
FIG. 4 is a flow chart for explaining a method for setting a virtual camera according to the invention.

As shown in FIG. 4, the game calculating means 200 first determines the position and direction of a player object based on operation data input from the operating mean 100 (step 401) and subsequently determines the position and direction of an enemy object based on data of the enemy object prepared in advance in the storage means 300 (step 402). At step 402, the game calculating means 200 determines not only the position and direction of the enemy object but also determines the position and direction of display objects to serve as a background.

The game calculating means 200 determines whether the distance between the player object and enemy object is equal to or smaller than a predetermined threshold N1 (step 403) and, if it is equal to or smaller than the threshold N1, a virtual camera setting process is performed by the virtual camera control means 400 (step 404).

At step 404, as shown in FIG. 5A, the virtual camera control means 400 specifically interpolates a locus 504 connecting three points 501 through 503, the point 501 being located on a line segment extending through the current position of the player object and the current position of the enemy object and being located behind the player object, the point 502 being located on a line segment extending through the position of the player object in the preceding frame and the position of the enemy object in the preceding frame and being located behind the player object, the point 503 being located on a line segment extending through the position of the player object in the frame before the preceding frame and the position of the enemy object in the frames before the preceding frame (the interpolated locus is represented by 505).

As shown in FIG. 5A, the virtual camera control means 400 interpolates a locus 509 connecting three points 506 through 508, the point 506 being the current position of the enemy object, the point 507 being the position of the enemy object in the preceding frame, the point 508 being the position of the enemy object in the frame before the preceding frame (the interpolated locus is represented by 510).

Next, as shown in FIG. 5B, the virtual camera control means 400 sets a virtual camera such that the player object and enemy object are caught in a field image by determining a point 511 on the locus 510 as the focal point (direction) of the camera and a point 512 on the interpolated locus 505 as the position of the virtual camera.

Then, the virtual camera is thus set as shown in FIG. 5C in which the interpolated locus 510 corresponds to the locus of the focal point of the virtual camera, and the interpolated locus 505 corresponds to the locus of the position of the virtual camera.

Although interpolation is performed with reference to two preceding frames in the virtual camera setting process described with reference to FIGS. 5A, 5B and 5C, this invention is not limited to the above description.

In the virtual camera setting process described with reference to FIGS. 5A, 5B and 5C, the virtual camera is set to pursue the movement of the player object and enemy object slowly by positioning the focal point 511 of the virtual camera and the position 512 of the virtual camera such that they are delayed in time from the current position 506 of the enemy object and the point 501, respectively. Alternatively, the virtual camera may be simply located behind the current position of the player object on a line segment extending through the current position of the player object and the current position of the enemy object such that the camera is directed to those objects.

When the virtual camera is set at step 404, the game calculating means 200 generates a field view which is the three-dimensional game space as viewed from the virtual camera using the image generating means 500 (step 405) to display the field view on the display means 600 (step 406).

Even when the distance between the player object and enemy object is not equal to or smaller than the threshold N1 (step 403), the game calculating means 200 performs the virtual camera setting process using the virtual camera control means 400 (step 407). At step 407, the virtual camera control means 400 sets the virtual camera for pursuing the player object as in the related art. Alternatively, the virtual camera may be set so that the virtual camera pursues a display object determined to be pursued thereby from background display objects and so that the player object is present in the field of view. When the latter setting is used, it may be regarded as a version of the process described with reference to FIGS. 5A, 5B and 5C in which the enemy object is replaced with the display object and in which the display object does not moves.

The process proceeds from step 407 to step 405.

The process shown in FIG. 4 is periodically executed and is also executed through an interrupt process when operating data are input from the operating means 100.

As described above, when objects are displayed as in the present embodiment, a player will not lose sight of an enemy object, which prevents a game from slowing down to allow the player to enjoy shooting operations.

While an enemy object is regarded differently from other display objects and the enemy object is pursued by the virtual camera with priority in the present embodiment, a display object among the display objects other than the enemy object which has been determined to be pursued by the virtual camera may be treated equally to the enemy object as a target. In this case, the display object may be pursued, for example, when there is a condition to pursue a target whichever closer to the virtual camera even if the distance between the display object determined to be pursued by the virtual camera and the player object and the distance between the enemy object and the player object are both equal to or smaller than the threshold N1.

In the present embodiment, two types of virtual camera setting processes are performed depending on whether the distance between a player object and an enemy object is equal to or smaller than the threshold N1. Alternatively, a threshold N2 greater than the threshold N1 may be provided; a virtual camera setting process similar to the virtual camera setting process at step 404 may be performed instead of the virtual camera setting process at step 407 when the distance between the player object and enemy object is greater than the threshold N1 but is equal to or smaller than the threshold N2; and the field angle of the virtual camera may be narrowed to provide a field view with higher visibility while catching the enemy object in the field of view.

Figure 6A:
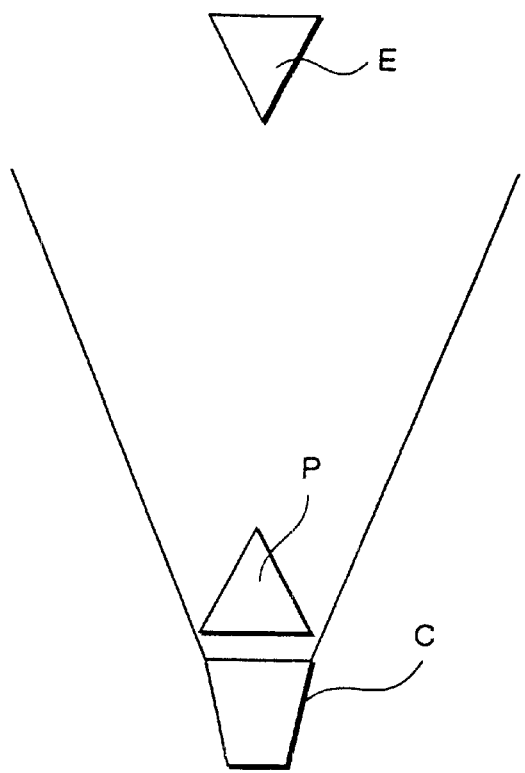
FIGS. 6A and 6B are illustrations of an example of display of objects according to the embodiment of the invention.
Figure 6B:
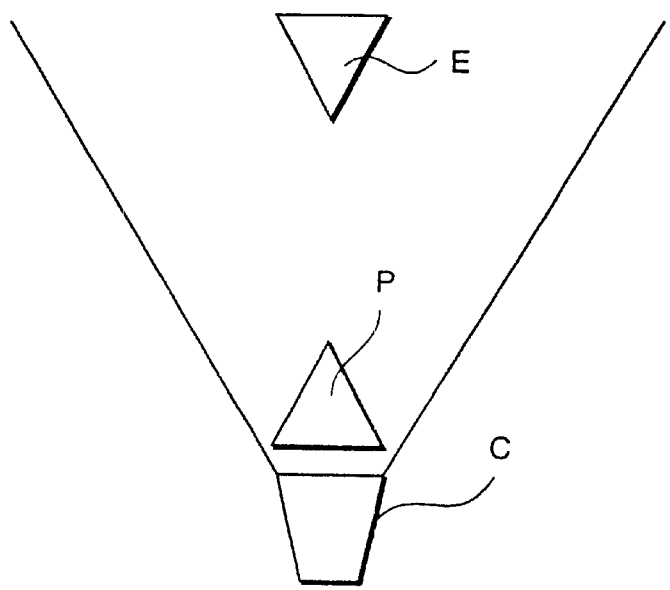

For example, when an enemy object E is located far from a player object P (the distance between them is greater than the threshold N1 and not greater than the threshold N2) as shown in FIG. 6A, the field angle of the virtual camera C may be narrowed. When the player object and enemy object become closer to reduce the distance between them to a value not greater than the threshold N1 as shown in FIG. 6B, the field angle of the virtual camera may be returned to the initial value. In order to simplify the description, FIGS. 6A and 6B show an example in which the virtual camera C is located behind the current position of the player object P on a line segment extending through each current position of the player object P and the enemy object E such that the camera is directed to those objects.

While the distances of the points 501 through 503, behind the position of the player object, on the line segment extending through the positions of the player object and enemy object especially from the position of the player object are not identified in the present embodiment, they may be predetermined distances and, alternatively, the distances from the position of the player object may be varied depending on the manner in which the player object moves.

Specifically, when the position of the player object abruptly moves (for example, when the player object gets behind the enemy object), the field of view can also abruptly change and may become hard to view. In such a case, the angle of the field image may be expanded by locating the points 501 through 503 closer to the player object to advance the position of the virtual camera. When the distance between the player object and enemy object abruptly changes (for example, when the player object and enemy object pass each other), the field of view can also abruptly change and may become hard to view. In such a case, the displacement of the field image may be made smooth by using a buffer or the like to make an adjustment such that a slight delay from the time of determination is reflected to the position and direction of the virtual camera.

While the present embodiment has referred to only one enemy object to simplify the description, there may be a plurality of enemy objects. In this case, since the distances between two or more enemy objects and a player object may be equal to or smaller than the threshold N1, the position of the virtual camera may be adjusted in accordance with the position of the enemy objects.

Figure 7A:
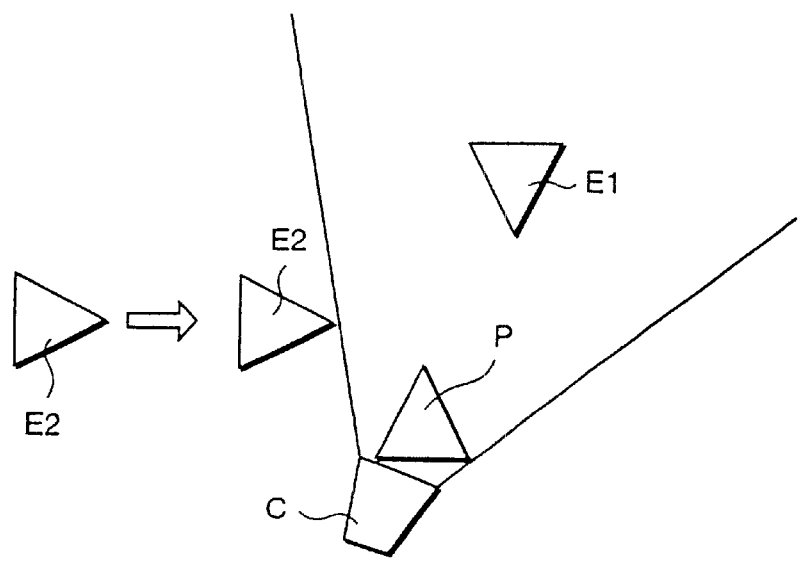
FIGS. 7A and 7B are illustrations of an example of display of objects according to the embodiment of the invention.
Figure 7B:
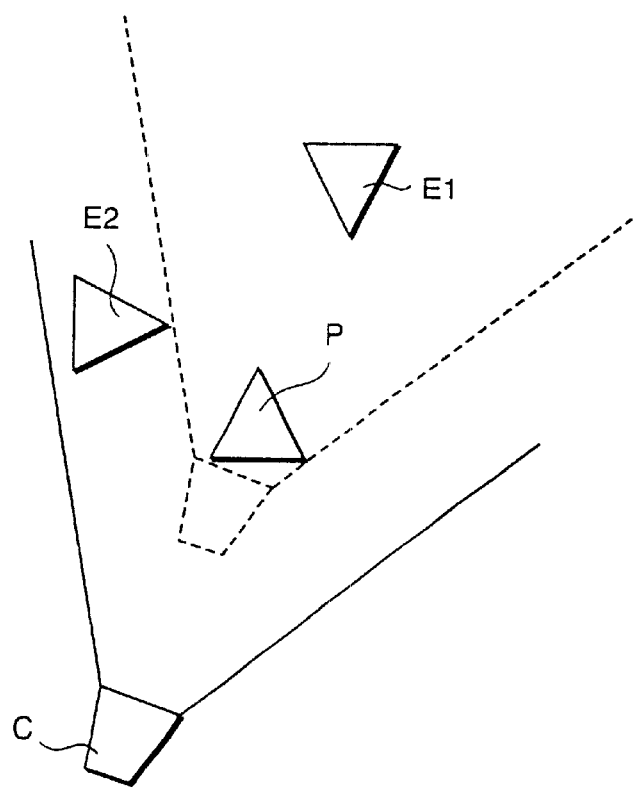

Specifically, when a new enemy object E2 approaches and the distance of the same becomes equal to or smaller than the threshold N1 while an enemy object E1 is caught in the field of view as shown in FIG. 7A, the virtual camera may be shifted backward to catch both of the enemy objects E1 and E2 in the field of view as shown in FIG.7B. At this time, if the distance between the player object and the enemy object E2 becomes shorter than the distance between the player object and the enemy object E1, the enemy object to be pursued by the virtual camera may be automatically changed from the enemy object E1 to the enemy object E2. This operation will be described later because it relates to a method of specifying an object to be beaten.

FIGS. 7A and 7B also show an example in which a virtual camera is located behind the current position of a player object on a line segment extending through the current position of the player object and the current position of an enemy object such that it is directed to those objects.

A brief description will now be made on a method of specifying an object to be beaten (i.e., an enemy object to be pursued by a virtual camera) when there is a plurality of enemy objects.

Considering the nature of shooting games, it is basically preferable that a player specifies an enemy object to be beaten and that a virtual camera pursues the specified enemy object.

Figure 8A:
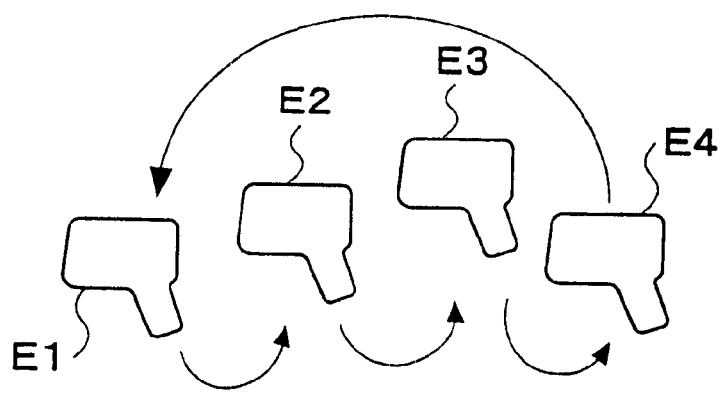
FIGS. 8A and 8B are illustrations of an example of a method for determining an object to be beaten according to the embodiment of the invention.
Figure 8B:
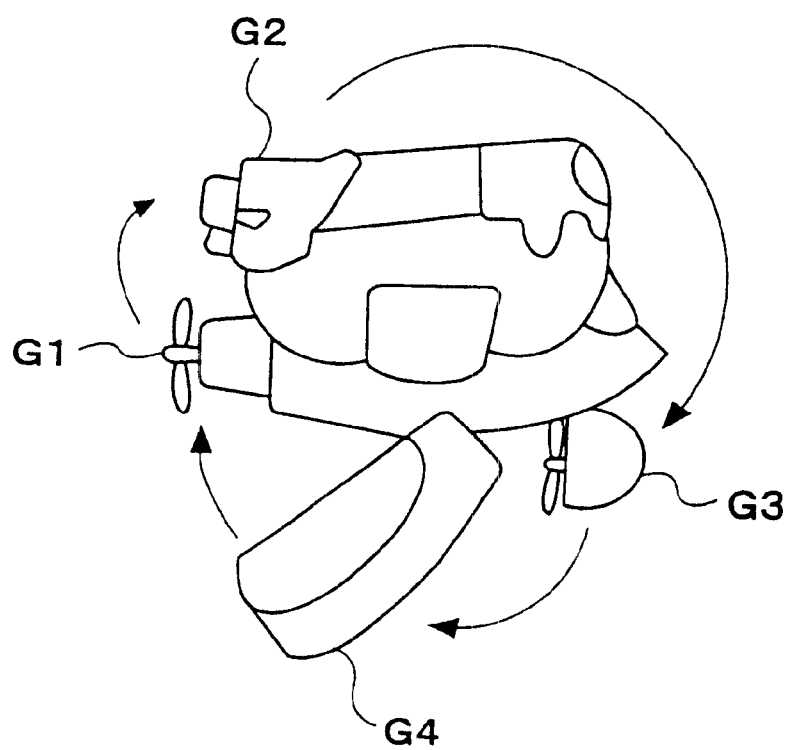

In order to improve operability at this time, for example, an arrangement is possible in which the player can sequentially switch enemy objects to be beaten as shown in FIGS. 8A and 8B. FIG. 8A shows sequential switching of a plurality of enemy objects E1, E2, E3 and E4 in choosing a target to be beaten. For example, while the enemy object E1 is a target object to be attacked, a button operation allows to switch the target object from E1 to E2. FIG. 8B shows sequential switching of a plurality of parts of an enemy object which is a single entity (a boss character or the like) but has a plurality of parts G1, G2, G3 and G4 to be beaten to choose a target to be beaten. For example, while one part G1 of an enemy object is a target part to be attacked, a button operation allows to switch the target part from G1 to G2.

When a new enemy object E2 approaches as shown in FIG. 7A, the virtual camera is shifted backward as shown in FIG. 7B to catch both of the enemy object E1 and the enemy object E2 in the field of view. Then, the player switches the target to be beaten to the enemy object E2. This means the enemy object to be pursued by the virtual camera is switched from the enemy object E1 to the enemy object E2. An alarm or the like for indicating approach of an enemy object may be issued at the time shown in FIG. 7A to inform the player of the enemy object's approach. This allows the player to switch the target to be beaten, and this makes display as shown in FIG. 7B inessential.

It is not essential to make all specifications through operations of the player, and an enemy object to be beaten may be automatically determined depending on the situation.

Figure 9A:
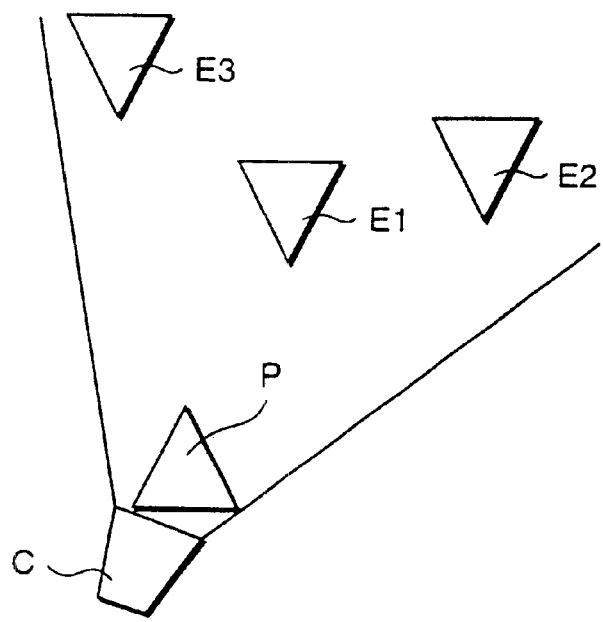
FIGS. 9A and 9B are illustrations of an example of a method for determining an object to be beaten according to the embodiment of the invention.
Figure 9B:
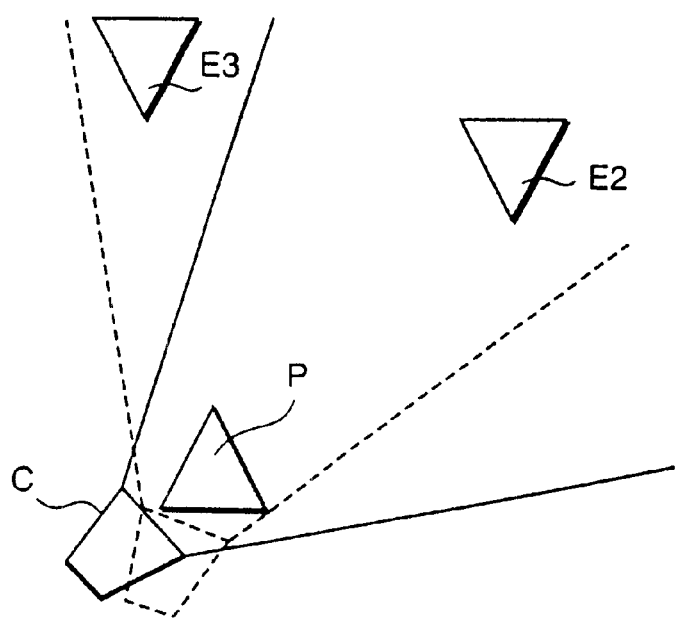

Specifically, after beating the enemy object E1 in a situation as shown in FIG. 9A, an automatic determination may be made to choose the enemy object E2 as next the target to be beaten as shown in FIG. 9B. At this time, referring to determination as to which of the enemy objects E2 and E3 is to be chosen as the next target to beaten, the enemy object closer to the player object may be selected and, alternatively, the enemy objects may be categorized into some levels and the selection may be made based on the order of the levels.

FIGS. 9A and 9B also show an example in which a virtual camera is located behind the current position of a player object on a line segment extending through the current position of the player object and the current position of an enemy object such that the virtual camera is directed to those objects.

Referring to the method of generating a field image, since the setting of a virtual camera is followed by processes which are similar to those in the related art, the contents of a process of drawing polygons and arithmetic processes including coordinate transformation, perspective transformation and light source calculations associated therewith will not be described herein.

In general, it is a fact that some players dislike three-dimensional shooting games.

One problem therefor is that such a player may suffer from a state like a so-called "motion sickness" as a result of abrupt changes of the field images. Another problem is that such a player is not used to performing the beating and moving operations simultaneously.

According to the method of displaying objects of the present embodiment as described above, since the field image is an image which is an objective view of the player object and enemy objects instead of being a subjective image as viewed from the player object, the former problem is eliminated, and the latter problem is also partially eliminated.

In order to mitigate the latter problem further, measures as described below may be taken.

(1) Measure to Adjust Speed

Figure 12:
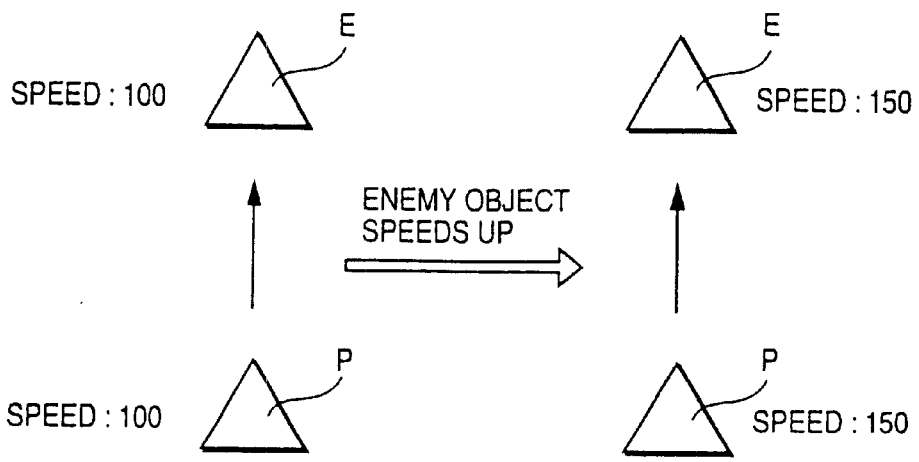
FIG. 12 is an illustration of an example of a measure to adjust speed according to the embodiment of the invention.

For example, the left part of FIG. 12 illustrates a player object P pursuing an enemy object E. Then, when the enemy object E speeds up as shown in the right part of FIG. 12, the speed of the player object can be matched to the speed of he enemy object in order to keep the distance between them. This can be limited when the speed of the enemy object is within a changeable speed range of the player object.

(2) Measure to Assist Pursuit

Figure 13:
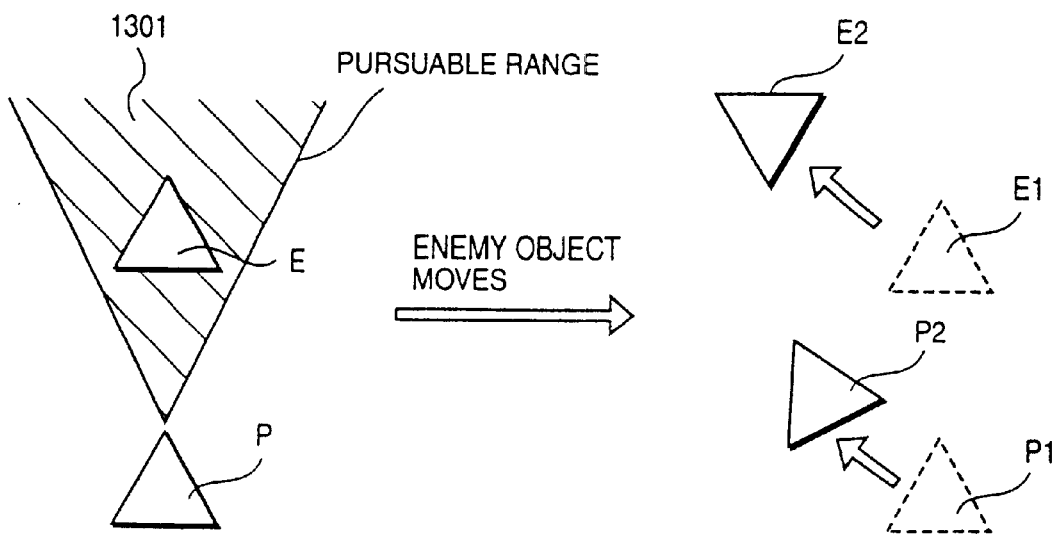
FIG. 13 is an illustration of an example of a measure to assist pursuit according to the embodiment of the invention.

The left part of FIG. 13 illustrates a player object P approaching an enemy object E, particularly a case when the enemy object E enters a designated range 1301. Then, when the enemy object E moves from E1 to E2, the player object P moves from P1 to P2 in accordance with movement of the enemy object, allowing to beat the enemy object E.

Figure 14:
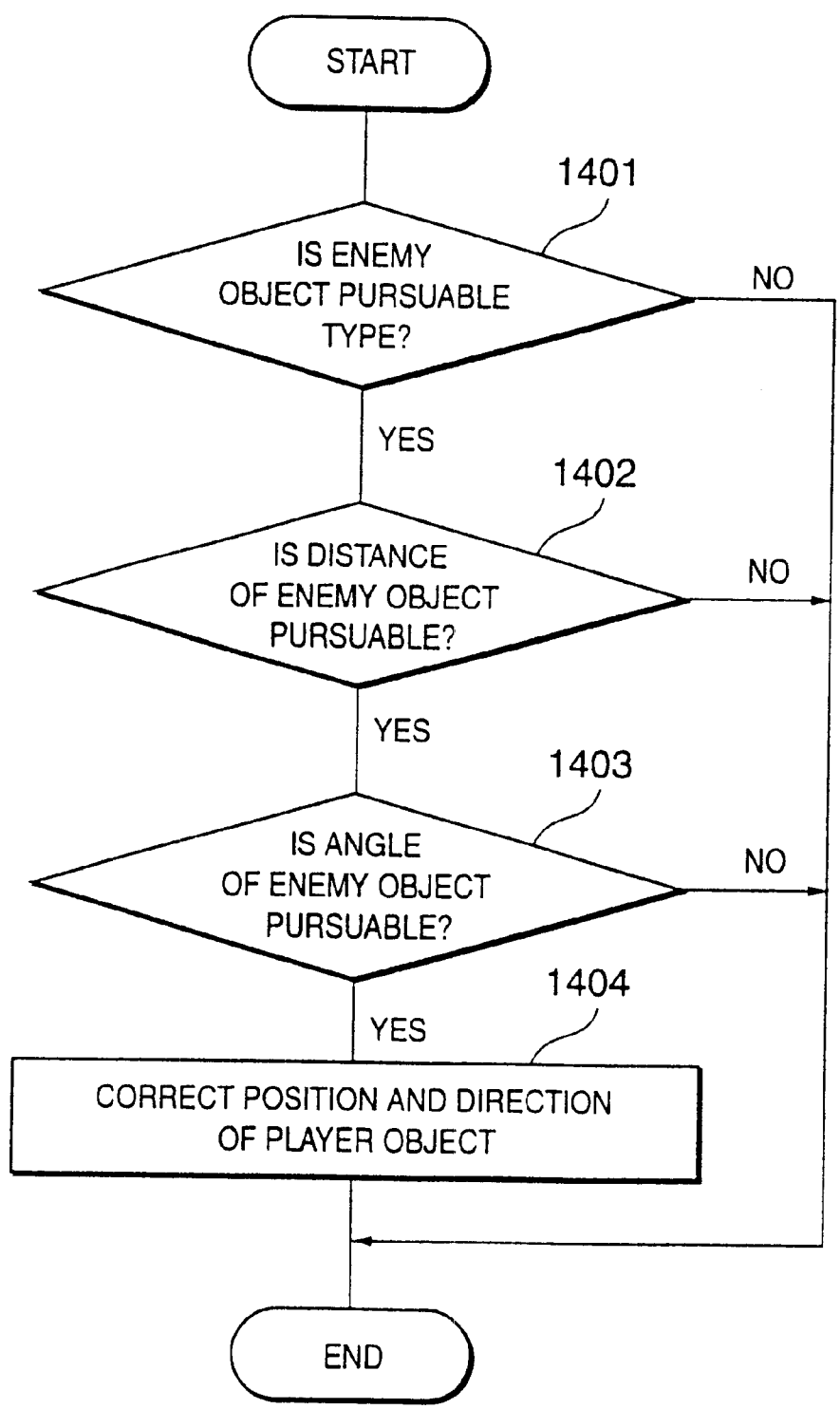
FIG. 14 is an illustration of an example of a measure to assist pursuit according to the embodiment of the invention.

Specifically, when the enemy object is a pursuable type (step 1401); the distance of the enemy object from the player object is pursuable (step 1402); and the angle of the enemy object from the player object is pursuable (step 1403) as shown in FIG. 14, the position and direction of the player's object can be corrected as shown in FIG. 13 (step 1404).

(3) Measure to Assist Avoidance

Figure 15A:
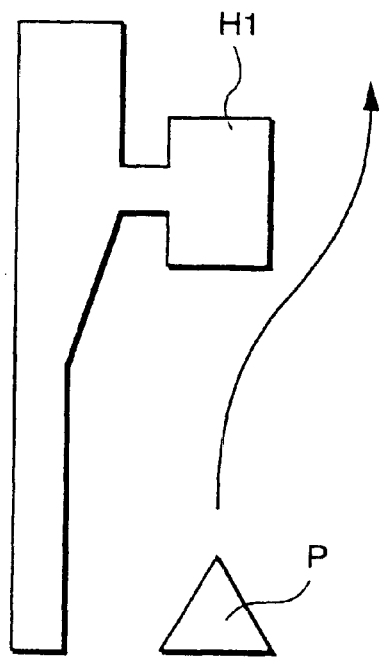
FIGS. 15A and 15B are illustrations of an example of a measure to assist avoidance according to the embodiment of the invention.
Figure 15B:
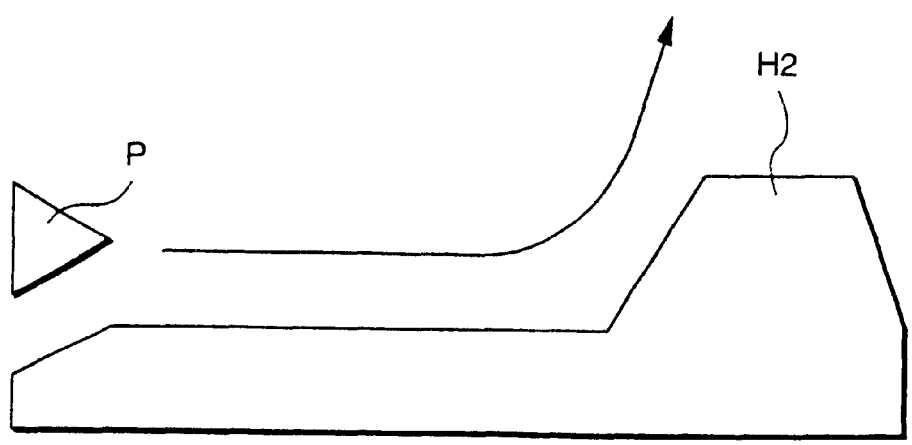

For example, when there is an obstacle Hi in the direction in which the player object proceeds as shown in FIG. 15A, a measure may be taken to avoid the same automatically. For example, when the obstacle H2 is very big as shown in FIG. 15B, a measure can be taken to avoid the same by moving along the same.

Figure 16:
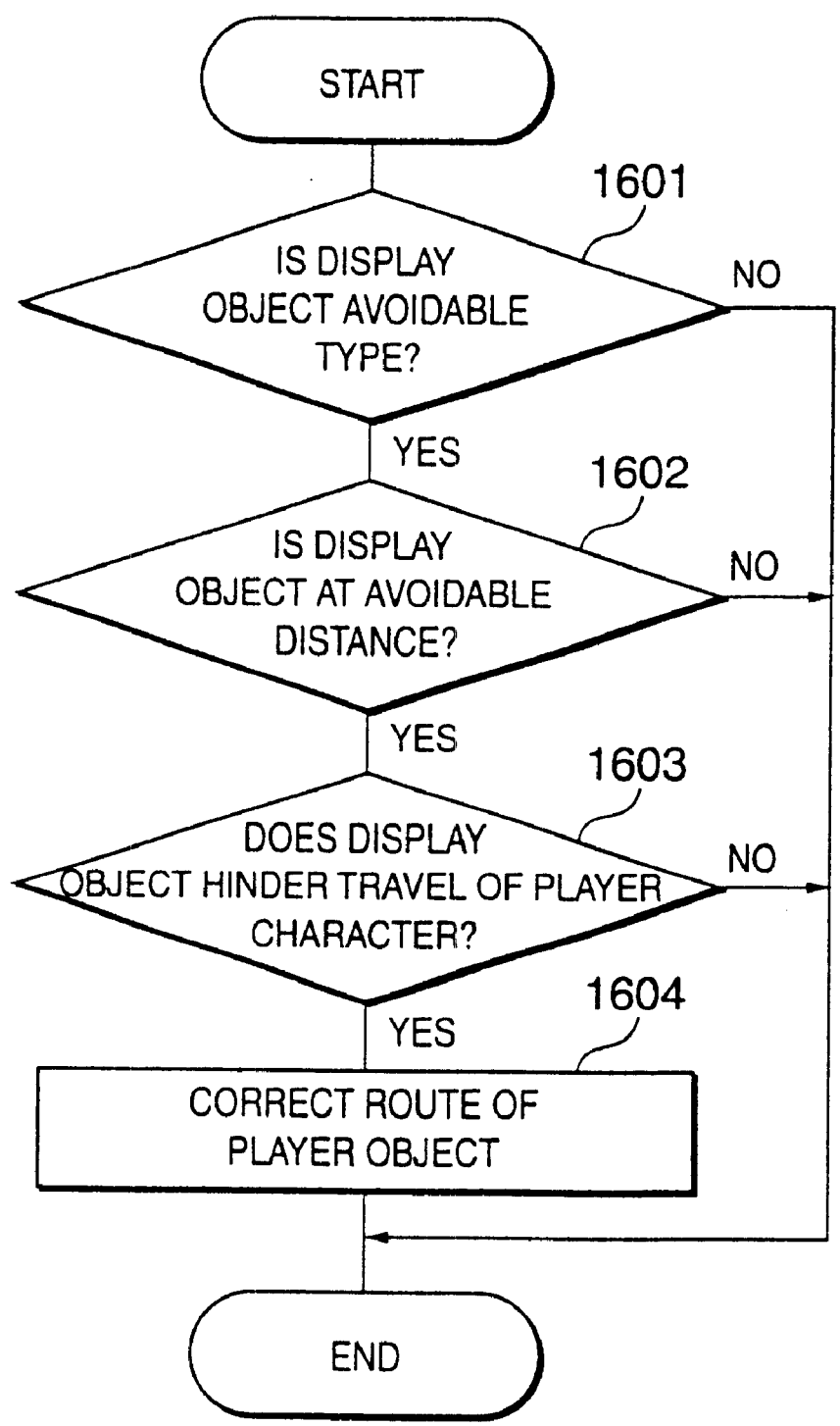
FIG. 16 is an illustration of an example of a measure to assist avoidance according to the embodiment of the invention.

Specifically, as shown in FIG. 16, when a display object is a avoidable type (step 1601); the distance of the display object from the player object is avoidable (step 1602); and the display object hinders the travel of the player object (step 1603), a route for avoiding can be searched to correct the route of the player object as shown in FIG. 15 (step 1604).

(4) Measure to Adjust Attitude

When the player object is a rotatable type such as a flying object, the attitude of the player object can be kept horizontal for a predetermined period during which there is no player operation.

The above-described measures make a game enjoyable even for an inexperienced player or a poor player at three-dimensional shooting games. The measures to be selected from among those measures may be determined by the player. Alternatively, a plurality of selectable player objects may be prepared in advance, and the measures to be taken may be determined depending on the selected player object.

As described above, according to the present invention, an enemy object is always displayed as long as the player object and the enemy object are within a predetermined distance from each other instead of providing display from the view point of the player object. This makes it possible to prevent a player from missing an enemy object without deteriorating three-dimensional display. This allows a player to enjoy shooting operations without slowing down the game.

What is claimed is:

1. A method for displaying an object in an entertainment apparatus to which an operating device can be connected, comprising the steps of:

moving a player object generated in a virtual world in accordance with an operation content accepted through said operating device from a player;

moving a game object generated in the virtual world based on data for a game;

setting a virtual camera in a direction to pursue the game object and in a position where the player object is kept in the field of view when the game object is present within the range of a predetermined distance N1 from the position of said player object; and generating a field image as viewed from the virtual camera.

2. A method for displaying an object according to claim 1, wherein, when two or more game objects exist within the range of the predetermined distance N1 from the position of said player object, said step of setting the virtual camera comprises of the steps of:

determining a game object to be displayed based on one of operation information from said operating device and the distance of the game object from said player object.

3. A method for displaying an object according to claim 1, wherein said step of setting the virtual camera further comprises the step of setting said virtual camera behind the position of said player object on a line segment extending through the position of said player object and the position of said game object such that the virtual camera is directed to both said player object and game object.

4. A method for displaying an object according to claim 1, wherein said step of setting the virtual camera further comprises the steps of:

calculating a first locus connecting two or more positions among the current position of said game object and one or more past positions of said game object;

calculating a second locus connecting two or more points among a point located behind the current position of said player object on a line segment extending through the current position of said player object and the current position of said game object and a point located behind the position of said player object on a line segment extending through one or more past positions of said player object and one or more past positions of said game object; and setting said virtual camera on a point on said first locus such that said virtual camera is directed toward a point on said second locus.

5. A method for displaying an object according to claim 1, wherein, when the game object is not present within the range of the predetermined distance N1 from the position of said player object, said step of setting the virtual camera comprises one of the steps of:

setting the virtual camera such that the virtual camera pursues said player object; and setting the virtual camera such that the virtual camera pursues a predetermined display object and such that said player object is present in the field of view.

6. A method for displaying an object according to claim 1, wherein, when the game object is not present within the range of the predetermined distance N1 from the position of said player object and when the game object is present within the range of a predetermined distance N2 (>N1) from the position of said player object, said step of setting the virtual camera comprises the step of setting the virtual camera such that the virtual camera pursues said game object and such that said player object is present in the field of view and decreases the field angle of said virtual camera by a predetermined value.

7. A method for displaying an object according to claim 1, wherein, when the game object is not present within the range of the predetermined distance N1 from the position of said player object and when the game object is not present within the range of a predetermined distance N2 (>N1) from the position of said player object, said step of setting the virtual camera comprises one of the steps of:

setting the virtual camera such that the virtual camera pursues said player object; and setting the virtual camera such that the virtual camera pursues a predetermined display object and such that said player object is present in the field of view.

8. A method for displaying an object according to claim 1, wherein said step of moving the player object comprises assisting step to match the speed of said player object to the speed of said game object when said game objects speeds up while said player object and said game object are traveling in the same direction provided that the distance therebetween is within a predetermined range.

9. A method for displaying an object according to claim 1, wherein said step of moving the player object comprises the step of correcting the direction of said player object such that it is directed to the position of said game object when the distance between said player object and said game object is within a predetermined range and when the angle of said game object as viewed from said player object is within a predetermined range.

10. A method for displaying an object according to claim 1, wherein, when there is a display object which hinders the travel of said player object, said step of moving the player object further comprises the step of correcting the route of said player object so as to avoid said game object.

11. An information recording medium readable by an entertainment apparatus to which an operating device can be connected, comprising a program recorded thereon for allowing the entertainment apparatus to execute the steps of:

moving a player object generated in a virtual world in accordance with an operation content accepted through said operating device from a player;

moving a game object generated in the virtual world based on data for a game;

setting a virtual camera in a direction to pursue the game object and in a position where the player object is kept in the field of view when the game object is present within the range of a predetermined distance N1 from the position of said player object; and generating a field image as viewed from the virtual camera.

12. An information recording medium according to claim 11, wherein, when two or more game objects exist within the range of the predetermined distance N1 from the position of said player object, said step of setting the virtual camera comprises the step of determining a game object to be displayed based on one of operation information from said operating device and the distance of the game object from said player object.

13. An information recording medium according to claim 11, wherein said step of setting the virtual camera further comprises the step of setting said virtual camera behind the position of said player object on a line segment extending through the position of said player object and the position of said game object such that it is directed to both said player object and game object.

14. An information recording medium according to claim 11, wherein said step of setting the virtual camera further comprises the steps of:

calculating a first locus connecting two or more positions among the current position of said game object and one or more past positions of said game object;

calculating a second locus connecting two or more points among a point located behind the current position of said player object on a line segment extending through the current position of said player object and the current position of said game object and a point located behind the position of said player object on a line segment extending through one or more past positions of said player object and one or more past positions of said game object; and setting said virtual camera on a point on said first locus such that the virtual camera is directed toward a point on said second locus.

15. An information recording medium according to claim 11, wherein, when the game object is not present within the range of the predetermined distance N1 from the position of said player object, said step of setting the virtual camera comprises one of the steps of:

setting the virtual camera such that the virtual camera pursues said player object; and setting the virtual camera such that the virtual camera pursues a predetermined display object and such that said player object is present in the field of view.

16. An information recording medium according to claim 11, wherein, when the game object is not present within the range of the predetermined distance N1 from the position of said player object and when the game object is present within the range of a predetermined distance N2 (>N1) from the position of said player object, said step of setting the virtual camera comprises the step of setting the virtual camera such that the virtual camera pursues said game object and such that said player object is present in the field of view and decreases the field angle of said virtual camera by a predetermined value.

17. An information recording medium according to claim 11, wherein, when the game object is not present within the range of the predetermined distance N1 from the position of said player object and when the game object is not present within the range of the predetermined distance N2 (>N1) from the position of said player object, said step of setting the virtual camera comprises one of the steps of:

setting the virtual camera such that the virtual camera pursues said player object; and setting the virtual camera such that the virtual camera pursues a predetermined display object and such that said player object is present in the field of view.

18. An entertainment apparatus to which an operating device can be connected, comprising:

player object moving means for moving a player object generated in a virtual world in accordance with an operation content accepted through said operating device from a player;

means for moving a game object generated in the virtual world based on data for a game;

virtual camera setting means for setting a virtual camera in a direction to pursue the game object and in a position where the player object is kept in the field of view when the game object is present within the range of a predetermined distance N1 from the position of said player object; and means for generating a field image as viewed from the virtual camera.

19. An entertainment apparatus according to claim 18, wherein said virtual camera setting means executes the steps of:

wherein said step of setting the virtual camera:

calculating a first locus connecting two or more positions among the current position of said game object and one or more past positions of said game object;

calculating a second locus connecting two or more points among a point located behind the current position of said player object on a line segment extending through the current position of said player object and the current position of said game object and a point located behind the position of said player object on a line segment extending through one or more past positions of said player object and one or more past positions of said game object; and setting said virtual camera on a point on said first locus such that the virtual camera is directed toward a point on said second locus.

\* \* \* \* \*